Sept. 16, 1969 E. HAYES 3,467,029
METHOD AND APPARATUS FOR THE MANUFACTURE OF A FOOD PRODUCT
Filed Sept. 1, 1965 5 Sheets-Sheet 1

INVENTOR.
EUGENE HAYES
BY James C. Nemmers
ATTORNEY

United States Patent Office 3,467,029
Patented Sept. 16, 1969

3,467,029
METHOD AND APPARATUS FOR THE
MANUFACTURE OF A FOOD PRODUCT
Eugene Hayes, Kansas City, Kans., assignor of fifty percent to Neil J. Hayes, Kansas City, Mo.
Filed Sept. 1, 1965, Ser. No. 484,384
Int. Cl. A21c *9/06;* A23l *1/34*
U.S. Cl. 107—1
15 Claims

ABSTRACT OF THE DISCLOSURE

Method and apparatus for the manufacture of a food product such as tacos, fried pies etc. which are produced by filling a thin shell with a prepared filling, folding the shell around the filling, crimping the edges of the folded shell and finally pinning the crimped edges of the folded shell by means of a wire or pin insertion into the crimped edges.

---

This invention relates to a method and apparatus for the manufacture of a food product, and more particularly, relates to a method and apparatus for continuously filling flat, thin shells, such as tortillas or the like, to produce filled products such as tacos or the like.

As is generally well known, a taco is an edible food product consisting of a somewhat circular thin piece of unleavened dough, called a tortilla, that surrounds a spicy meat filling, the taco usually being cooked in a deep-fat fryer. Tacos have in the past always been produced by hand, the flat, thin tortilla being folded, filled and pinned together prior to cooking. This manual process is rather slow, and the production of tacos can be increased only by increasing the number of workers, thus making the labor cost of tacos relatively high.

Similar to the pizza fad which started several years ago and which has now swept substantially the entire counntry, tacos are becoming more and more popular, and the demand for them is increasing. Because they are presently produced manually, production of tacos in some areas has been unable to keep up with the demand and, as already mentioned, manual production keeps the cost relatively high. With the increasing demand for tacos, a substantial competitive advantage would be obtained by one who could produce tacos at a sufficiently high rate to meet the demand without raising the cost. However, there is not known to me any method or machine for producing tacos and like products at a relatively high rate and low cost.

It is therefore an object of my invention to provide a method and apparatus for continuouly making a food product such as tacos or the like.

It is another object of my invention to provide a machine which will automatically fold, fill, and pin together a flat thin piece of material, such as unleavened dough.

It is a further object of my invention to provide a machine that will crimp and pin together two relatively flat and thin but pliable pieces of material, quickly and easily.

It is still a further object of my invention to provide an improved mechanism for automatically pinning together two pieces of flat, thin, foldable material, the pins being formed from a continuous piece of wire.

It is still a further object of my invention to provide an improved device for feeding a piece of bendable wire intermittently in the same direction. In accordance with this object, my novel device also prevents the wire from backing up between feed strokes.

It is another object of my invention to provide a relatively simple, inexpensive apparatus and method for making a food product such as tacos or the like.

These and other objects of my invention will be readily apparent from a consideration of the following description taken in connection with the accompanying drawings, in which.

Figure 1:
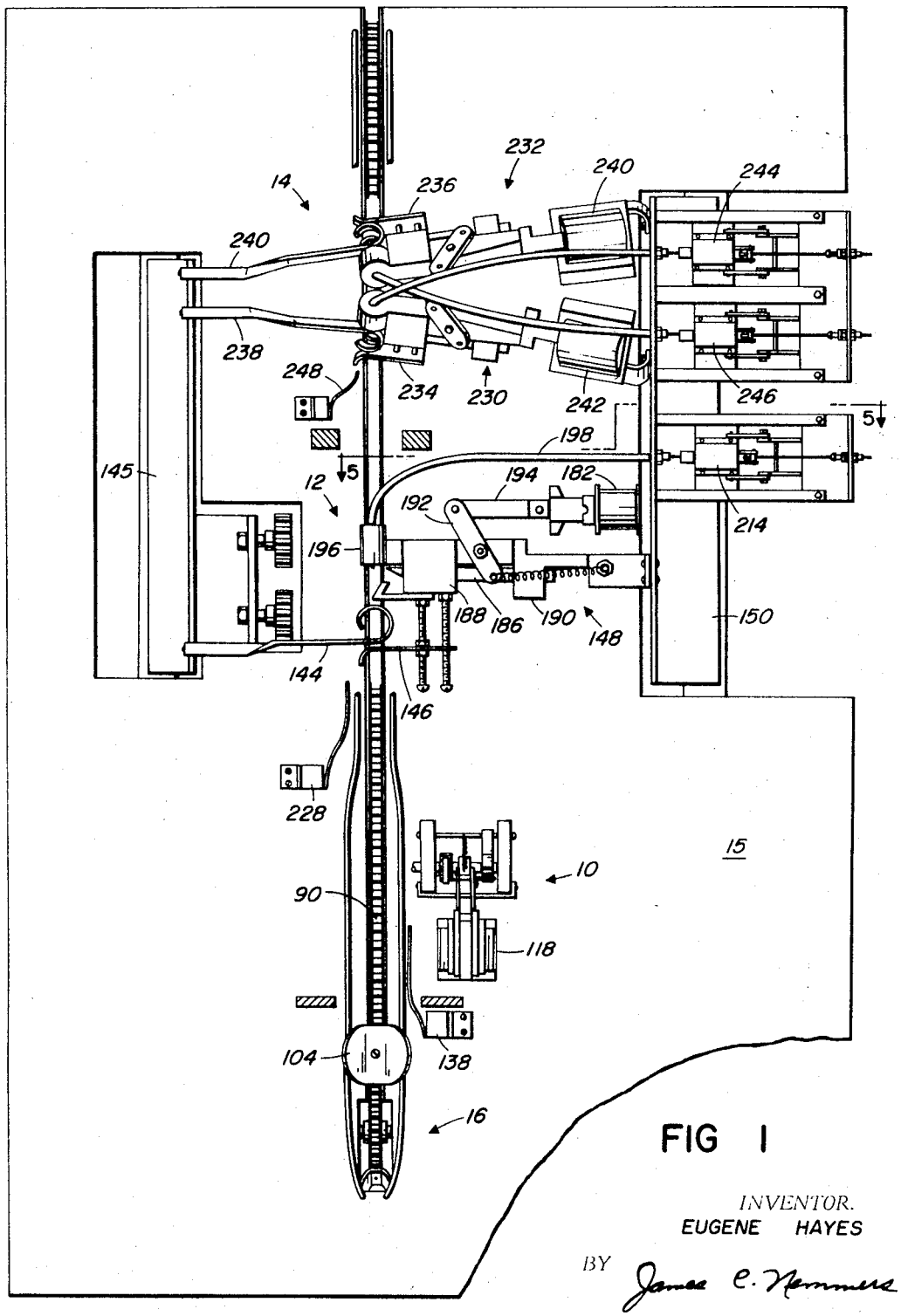
FIG. 1 is a plan view of my novel machine with the hopper removed and showing the stations at which the various operations are performed upon the product.
Figure 2:
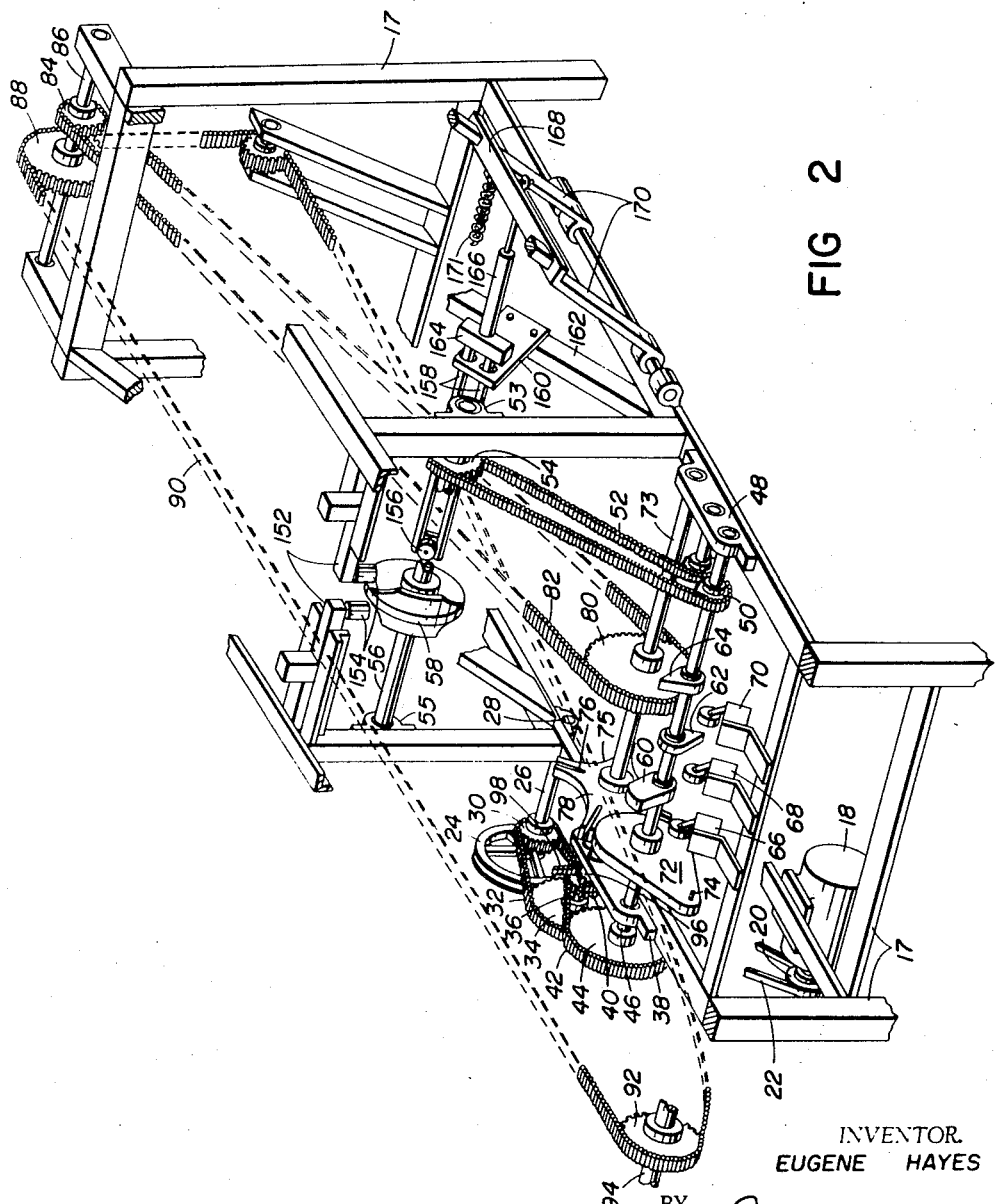
FIG. 2 is a perspective view of the drive assembly, viewing the machine from the right front, the drive assembly being located below the table upon the various operations are performed, the table and portions above and part of the supporting framework not being shown in order more clearly to illustrate the drive assembly.

Referring now to FIG. 1, the illustrated machine is a preferred embodiment which is designed for producing tacos or the like. Throughout the description which follows, reference to the front or rear of the machine will refer to the portions of the machine at the top and bottom, respectively, of FIG. 1. Similarly, the right or left sides of the machine refer to the right or left of FIG. 1. The machine has a filling station 10, a first or top crimping and pinning station 12, and a second or side crimping and pinning station 14, all positioned above a table 15 that is supported on suitable framework 17 (FIG. 2). The several stations are located along the path of a chain conveyor, indicated generally by the reference numeral 16, which advances the product intermittently in timed sequence with the operations performed at the stations. The assembly which drives both the conveyor and the mechanisms which perform the operations at each station is shown in FIG. 2 and will now be described in detail.

Drive assembly

A power source, such as an electric motor 18, is mounted on the lower left side of the framework 17 and runs continuously during operation of the machine to drive a pulley 20 which is connected by a V-belt 22 to the main drive pulley 24. The pulley 24 is mounted on a shaft 26 turnable in a suitable bearing 28 and to which is affixed a sprocket 30. The sprocket 30 is connected by a chain 32 to a larger sprocket 34 that is secured to a shaft 36 turnable continuously in a bearing structure 38 mounted on the left side of the framework 17 of the machine. A second and smaller sprocket 40 is also secured to and turnable with shaft 36 and is connected by chain 42 to a larger sprocket 44 which is secured to a main drive shaft 46 that is located forwardly of shaft 36. Shaft 46 extends the width of the machine and is turnable in a bearing structure 48 on the right side of the machine and bearing structure 38 on the left side. Shaft 46 is driven continuously and serves to operate several components of the machine. First, a sprocket 50 affixed to shaft 46 near the right side of the machine is connected by a chain 52 to a sprocket 54 mounted on a shaft 56 extending transversely of the machine near the center thereof. Shaft 56 is turnable in suitable bearings 53 and 55 mounted on the right and left sides, respectively, of the machine. A main cam 58 is affixed to the center of shaft 56 and thus is continuously rotated and serves to operate the crimping and pinning mechanisms at stations 12 and 14 as described more fully hereinafter.

The continuously rotating main shaft 46 also has affixed thereto and rotatable therewith three cams 60, 62 and 64, which actuate the trip arms of limit switches 66, 68 and 70, respectively. These switches control the filling and two pinning operations and their functions will be described more fully hereinafter.

An eccentric drive wheel 72 is fixed to shaft 46 near the left side of the machine and forms the driving part of a mechanism for intermittently turning a shaft 73 that extends parallel to shaft 46 and which is also turnable in bearing structures 38 and 48. The drive wheel 72 contains a drive pin 74 which is positioned radially outwardly from the center of wheel 72 and which is engageable sequentially with one of the four equally spaced radial grooves 76 formed in the drive wheel 78 that is affixed to the shaft 73. The circular portion of drive wheel 72 turns in concave portions 75 formed between the grooves 76 of wheel 78 during which time shaft 73 is stationary. Since drive wheel 72 rotates constantly, the pin 74 on drive wheel 72 will engage in one of the grooves 76 on the wheel 78 and turn the wheel 78 through approximately 90 degrees during each revolution of wheel 72. It is obvious, therefore, that movement of the wheel 78, and thus the shaft 73, will be intermittent, and shaft 73 will make one revolution for each four revolutions of shaft 46.

The intermittent motion of shaft 73 is used to drive the chain conveyor 16 (FIG. 1) intermittently and thus advance each article carried thereon intermittently from station to station at each of which a different operation is performed. A sprocket 80 is also affixed to shaft 73 near its center, and through the chain 82 sprocket 80 drives a sprocket 84 that is affixed to a shaft 86 located at the rear of the machine just beneath the table 15. A second sprocket 88 is also affixed to shaft 86 and intermittently drives the chain 90 of conveyor 16. The chain 90 also engages an idler sprocket 92 fixed to shaft 94 at the front of the machine. Thus, the conveyor 16 is intermittently driven and moves longitudinally from the front to the rear of the machine.

The intermittently driven shaft 73 also serves to drive one other mechanism. On the left side of shaft 73 outwardly of the bearing structure 38 there is affixed a small sprocket 96 which turns a chain 98 that drives a sprocket 100 (FIG. 3) mounted on shaft 102 above the table 15. This shaft 102 serves to drive the auger and stirrer in the filling hopper as will be described more fully hereinafter.

The conveyor chain 90 has affixed to it at equally spaced intervals a plurality of thin flexible holders 104 which are preferably circular in shape when the machine is being used for the production of tacos. Only one such holder 104 is shown in FIG. 1; the others are not shown in the drawings in order to avoid confusion of details of the machine. The holders 104 are advanced from station-to-station in the machine as the conveyor 16 is intermittently driven. At the entrance or front end of the machine, the articles to be folded, filled and pinned are manually, or by other means automatically, fed to the conveyor 16, and one article is placed on each of the holders 104. Guide rails 106 are provided above the table 15 and extend along the conveyor 16, one on each side thereof, from the point at the front end of the machine where the conveyor chain 90 passes around sprocket 42 to the rear of the machine where chain 90 engages sprocket 88. The rails 106 are initially parallel to each other and fairly close together and close to the table 15. Thus, the guide rails 106 will engage the bottom of each holder 104 as it rises from beneath the table 15 on conveyor chain 90, and as the holder 104 is moved along the conveyor its sides will be folded slightly upwardly, thus folding the article being carried thereon.

Filling station

If the final products being made are tacos, the articles fed onto the holders 104 will be tortillas, which are flat, thin pieces of unleavened dough. The tortillas must be filled in order to make tacos. Thus as a folded tortilla enters the filling station 10 on a holder 104, a wedge-shaped spreader 108 (FIG. 3) mounted between the rails 106 will spread the sides of the tortilla to assure that it is opened properly for filling. At about the point where the spreader 108 is located, the guide rails 106 diverge slightly and remain spaced further apart as the tortilla passes beneath a filling wheel 110. Beyond the filling wheel 110, the rails again converge, become parallel and remain parallel and closely spaced throughout the remaining distance along the conveyor 16.

Figure 3:
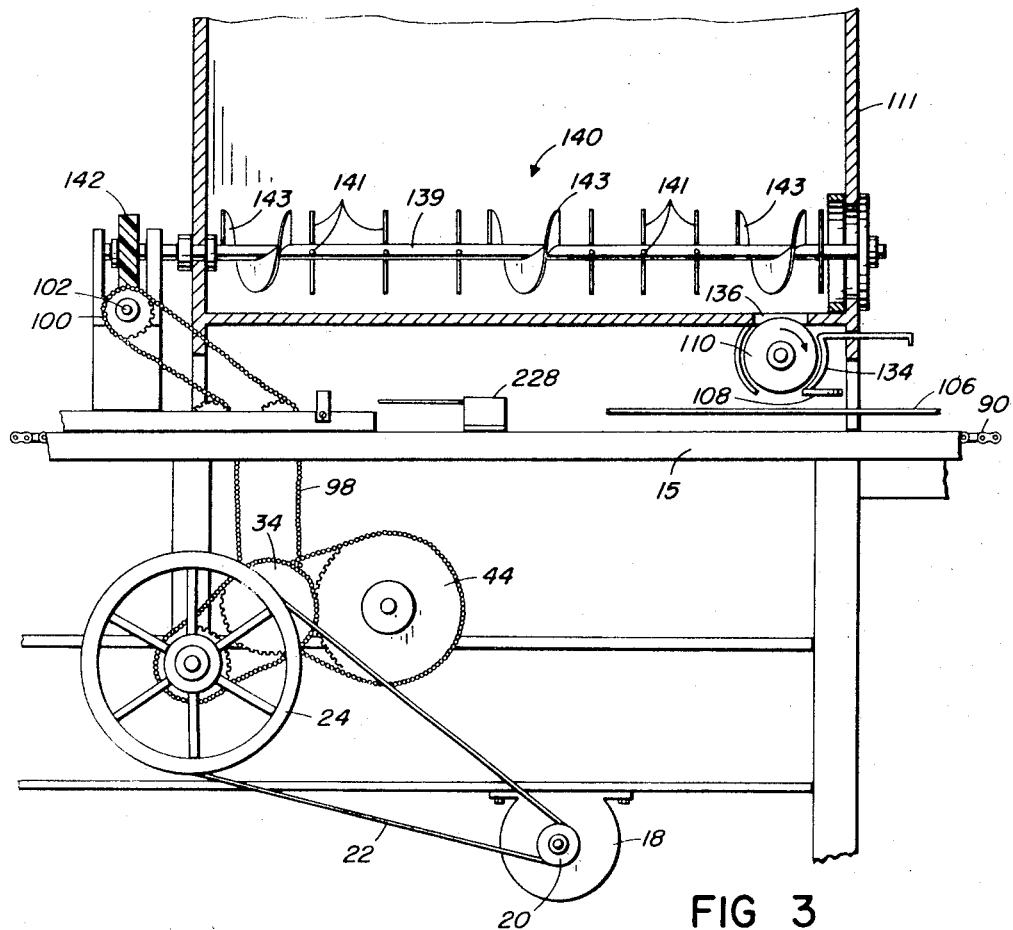
FIG. 3 is a side elevational view of the filling station with parts in section to more clearly illustrate the details of the filling mechanism.
Figure 4:
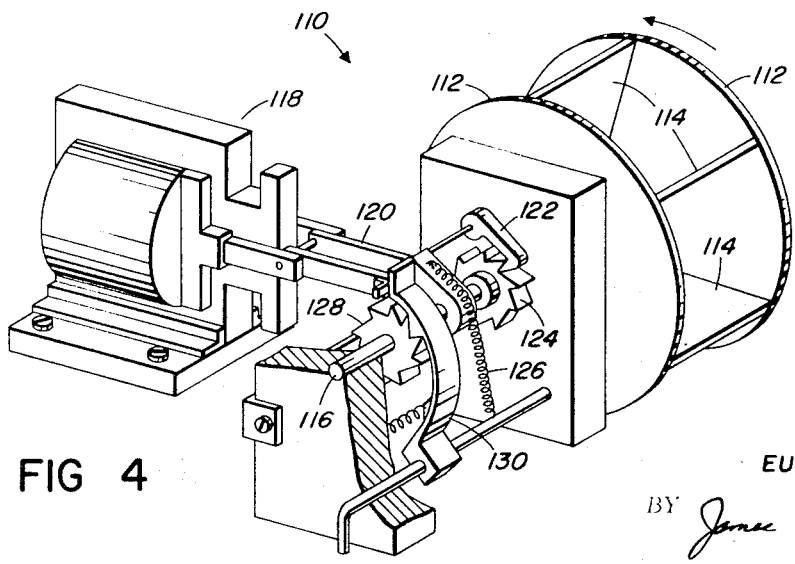
FIG. 4 is a perspective view of the drive mechanism for the filling wheel.
Figure 7:
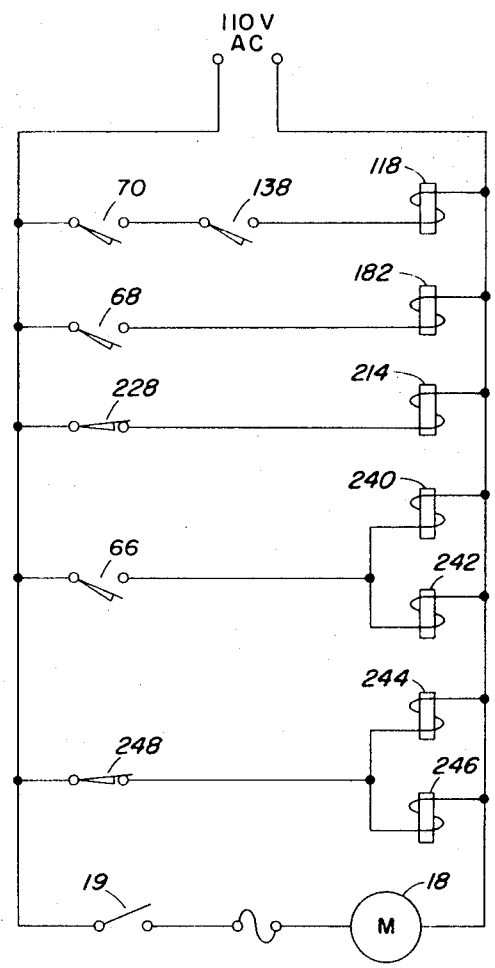
FIG. 7 is a schematic wiring diagram of the control system for the machine.

The filling wheel 110 is mounted beneath a hopper 111 which is supported on table 15 as shown in FIG. 3. The wheel 110 and its drive mechanism are shown in detail in FIG. 4. The wheel 110 consists of two circular axially spaced apart side members 112 joined by radially oriented dividers 114 which define a plurality of segmental compartments of the desired size and number. The filling wheel 110 is turnably mounted on a shaft 116 and is intermittently rotated in properly timed sequence with the presentation of a holder 104 containing an unfilled tortilla. Proper timing is accomplished by the design and location of cam 64 on the main drive shaft 46. This cam 64 intermittently trips the limit switch 70 which is in circuit (see FIG. 7) with a solenoid 118 that operates the drive mechanism. Thus, when the limit switch 70 is tripped and closed by cam 64, the solenoid 118 is energized causing the lever 120 connected thereto to be pulled to the left (FIG. 4). A pawl 122 is connected to the lever 120 and engages a ratchet wheel 124 on shaft 116. Thus, when the solenoid 118 is energized, the ratchet wheel 124 will be turned and the filling wheel 110 rotated through a predetermined portion of a revolution. Obviously, depending upon the number of compartments in the wheel 110, the mechanism could be designed to rotate the wheel 110 through any desired number of degrees. When the limit switch 70 becomes disengaged from the cam 64 and thus opens, the solenoid 118 is de-energized, permitting a spring 126 to return the pawl to its initial position in preparation for the next cycle. The second ratchet 128 and arm 130 prevent the filling wheel 110 from being turned more than the desired amount.

The compartments of the filling wheel 110 are filled with the desired filling material from the hopper 111 through an opening 136 in the bottom of the hopper 111. A curved retaining plate 134, which may form the mounting for the spreader 108, is located closely adjacent to the leading end of filling wheel 110 and extends around the periphery of the wheel from the filling opening 136 to a point where each compartment 114 deposits its contents into a properly positioned tortilla on a holder 104. Thus, during each cycle of operation, the uppermost compartment of wheel 110 will be filled from the hopper 111 while at the same time the lowermost compartment is depositing its contents into a tortilla. In order to prevent the filling wheel 110 from operating and releasing the contents from one of its compartments in the event a tortilla is not present, I prefer to provide a limit switch 138 positioned adjacent the conveyor 16. This switch 138 is normally open and is closed by engagement of its actuating arm with a tortilla present on a holder 104 properly positioned beneath the filling wheel 110. If a tortilla is not properly positioned beneath the filling wheel 110, the switch 138 will remain open and prevent energization of the solenoid 118 when the limit switch 70 is tripped by cam 64 (see FIG. 7).

In order to prevent the material in the hopper 111 from becoming compacted and also in order to assure continuous feeding of material in the hopper to the filling opening 136, I prefer to provide along the bottom of the hopper a combination mixing bar and auger 140. The auger 140 includes a shaft 139 that preferably is provided with a plurality of radially extending pins 141 and one or more volute shaped blades 143. The auger 140 is rotatably driven slowly by a pinion 142 that is connected to the auger shaft 139, the pinion 142 being driven by a worm gear (not shown) affixed to shaft 102. Thus, the auger 140 is intermittently driven through sprocket 100 as previously described.

With the above described arrangement comprising the filling station, each holder 104 which contains a tortilla and which is properly positioned beneath the filling wheel 110 will cause the filling apparatus to be actuated, and the torilla will be filled and automatically advanced to the next station where the now-filled tortilla will be pinned along its top edges.

Top pinning and crimping station

At this station 12 the first of two crimping and pinning stations the top edges of the folded tortilla are crimped and then pinned together. Because of the intermittent operation of the conveyor 16, the folded tortillas which were filled at the filling station 10 will be advanced and each one stopped and positioned momentarily between two crimpers 144 and 146. Crimper 144 is fixed to a movable support member 145 on the left side of table 15 while the crimper 146 is mounted on and movable with the pinning mechanism, indicated generally by the reference numeral 148, on the right side of the machine. As will be described, the crimpers 144 and 146 are movable toward and away from each other and the conveyor 16. Each of the crimpers 144 and 146 is preferably formed from a rectangular flat bar whose end is curved and bifurcated. The space between the bifurcations permits insertion of the pin into the tortilla while it is held in a crimped condition. As best seen in FIG. 1, when crimpers 144 and 146 are advanced toward conveyor 16, the two top edges of a folded properly positioned tortilla will be formed in a somewhat S shape. This permits the insertion of a pin along a line generally parallel with conveyor chain 90 through the top edges of both thicknesses of the tortilla in two places.

Figure 5:
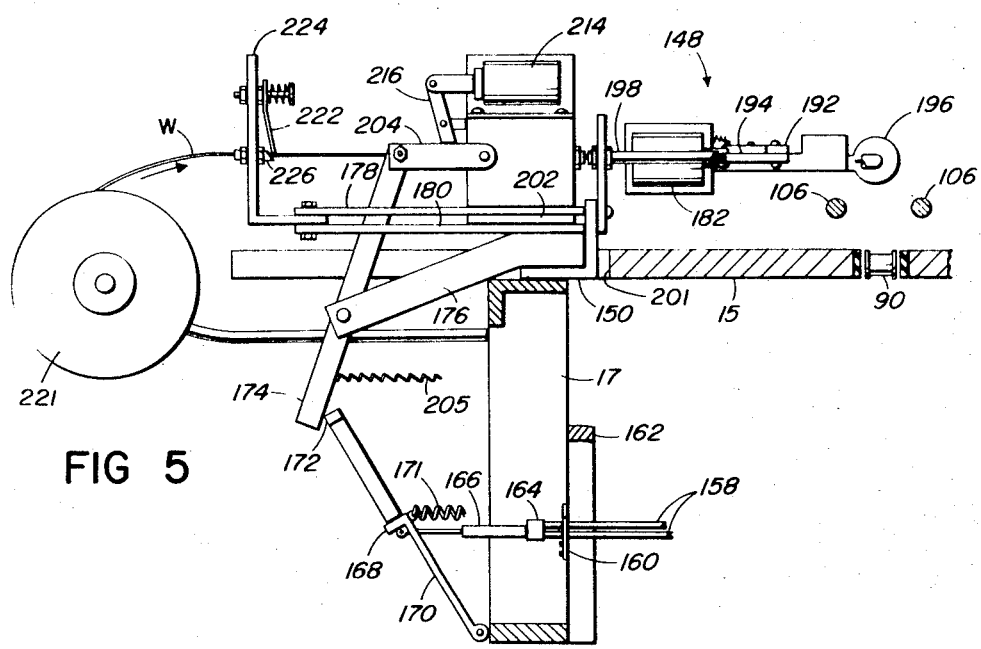
FIG. 5 is a sectional view taken on the line 5—5 of FIG. 1, and illustrating one of the pinning assemblies.

As indicated above, the crimper 146 is moved or advanced toward crimper 144 since it is secured to the movable pinning mechanism 148. As shown in FIGS. 1 and 5, the entire pinning mechanism 148 together with crimper 146 is mounted on a movable supporting member 150. The supporting members 145 and 150 are movable inwardly and outwardly by lateral bars 152 (FIG. 2), which are connected to the supporting members. Each of the bars 152 has its inner end of a cam follower 154 that is engageable with the continuously rotating cam 58. Thus, when the lobe of the cam 58 is passing through the upper portion of its cycle, it will cam the lateral bars 152 outwardly thus forcing the supporting members 145 and 150 outwardly and carrying with them the entire pinning mechanism 148 and crimpers 144 and 146. As the lobe of the main cam 58 travels through the lower part of a cycle, the crimpers 144 and 146 and the pinning mechanism 148 carried by the supporting members 145 and 150 will be moved inwardly by the following described mechanism.

A cam follower 156 is carried by a pair of parallel bars 158 which extend laterally across the machine and which are slidably mounted at each side of the machine in a bearing plate 160. The bearing plate 160 on the left side has not been shown in FIG. 2 in order to avoid confusion with other parts of the machine. However, the construction is substantially similar to that shown on the right side of the machine in FIG. 2. Each of the bearing plates 160 is mounted on an angular supporting member 162 that is affixed to the framework 17. A cross-member 164 joins the ends of the parallel bars 158 at the right side of the machine, this cross-member 164 serving as a stop when it engages the bearing plate 160. Extending outwardly to the right from the cross-member 164 and parallel to the bars 158 is a connecting member 166 which is pivotally connected to a crossbar 168 that extends between two upright arms 170 which are pivotally connected at their lower ends to the frame 17 as shown. A spring 171 has one end connected to the crossbar 168, extends laterally across the machine, its other end being affixed to the frame 17 in any suitable manner. Spring 171 serves to bias the upright arms 170 inwardly and through the above described linkage, will maintain the follower 156 in engagement with cam 58. At the upper ends of the upright arms 170 there is a second cross-member 172 (FIG. 5). This cross-member 172 engages the inside lower end of an arm 174 that is pivotally mounted intermediate its ends on an outwardly extending supporting arm 176 which is fixed to the movable supporting member 150.

Extending outwardly and affixed to the movable supporting member 150 are the two pairs of upper and lower supporting members 178 and 180, respectively. The upper member 178 and lower member 180 of each pair are vertically spaced apart and are parallel to each other. These pairs of supports straddle the arm 174 and provide a mounting for the pinning assembly 148, which is therefore movable toward and away from the conveyor 16 since it is carried by the movable supporting member 150. The wire pinning assembly 148 includes a solenoid 182 fixed to the movable supporting bar 150 and a cutting bar 186 slidably mounted near the solenoid 182 in two guide blocks 188 and 190. The cutting bar 186 is operated by a lever 192 pivoted intermediate its ends, one end of lever 192 being connected to the cutting bar 186 and the other end being connected to the operating arm 194 of the solenoid 182. The solenoid 182 is controlled by the switch 68 which is operated in properly timed sequence by the cam 62 on the shaft 46. It will be noted from FIG. 1 that the crimper 146 is secured to the guide block 188, and thus, as previously mentioned, moves toward and away from conveyor 16 along with the pinning assembly 148. A wire holder 196 is positioned adjacent the path of travel of the cutting bar 186. This holder 196 is also mounted on the guide block 188, and wire W fed to the holder 196 will be discharged from the face of the holder at a right angle to the path of travel of the cutting bar 186. Thus, a length of wire extending from the holder 196 will be cut off as the cutting bar 186 is advanced across the face of the holder 196. Wire W fed to holder 196 is guided through a tube 198 connected to the inlet end of the holder 196, the tube 198 being connected at its other end and terminating at the movable supporting member 150. In order to feed the wire through the tube 198 and holder 196, I prefer to provide a wire pusher unit, indicated generally by the reference numeral 200, and shown in detail in FIG. 6. The unit 200 is mounted on a horizontal plate 202, the ends of which are received between but not fixed to the upper and lower supporting members 178 and 180, thus allowing the wire pusher unit 200 to move relative to the supporting member 150 and relative to the wire holder 196. The pusher unit 200 is initially advanced together with the supporting member 150 by movement of the arm 174. However, the upper end of arm 174 is pivotally connected to pusher arms 204 which are in turn pivotally connected to the pusher unit 200. Thus, when supporting member 150 has been advanced to its furthest point, as limited by the edge 201 of table 15, continued movement of cross-member 172 will cause arm 174 to pivot and advance the unit 200 relative to the member 150. A spring 205 connected between the frame 17 and the lower end of arm 174 maintains the unit 200 normally in a retracted position as well as retracting the entire crimping and pinning assembly mounted on member 150.

Figure 6:
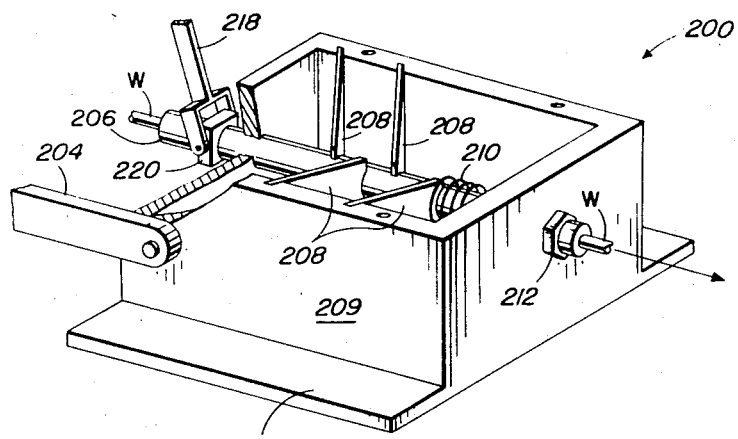
FIG. 6 is a perspective view of one of the wire-pusher units which forms a part of the pinning assembly.

So that the wire will be advanced and thus pushed through the tube 198 when the pusher unit 200 advances, the pusher unit 200 contains a hollow tube 206 through which the wire extends. The tube 206 has a plurality of angular slots therein into which blades 208 extend. The blades 208, as best seen in FIG. 6, have their other ends seated in vertically extending, angular slots in the side walls 209 of the pusher unit. Thus, the blades 208 extend generally in the desired direction of movement of the wire and at an angle thereto. The slots in the tube 206 are sufficiently deep so that edges of the blades 208 will engage wire passing through the tube 206, and due to the angle of the blades 208, the wire will move freely in one direction only. It should be further noted that the blades 208 are seated in slots slightly wider than the thickness of the blades and therefore the wire engaging ends of the blades 208 can be moved axially a slight distance. This construction provides for a feature which permits the unit 200 to be advanced without pushing the wire W and is accomplished by moving the tube 206 forward axially relative to the unit 200. Thus, if the tube 206 is moved a short distance in the direction of the desired movement of the wire, the blades 208 will be moved out of engagement with the wire and the wire will not be advanced even though the unit 200 is advanced. The tube 206, however, is normally maintained in its rearmost position with the blades 208 engaging the wire by means of a spring 210 and a stop nut 212 secured to the tube 206 on the exterior of the unit 200 limits the rearward movement of the tube 206 relative to the unit 200. Preferably, to make the operation automatic, the tube 206 is moved forwardly, thus releasing the blades from engagement with the wire W by means of a solenoid 214 which has its operating rod 216 pivotally connected to an arm 218 that is pivotally connected at its lower end to the tube 206. A stop-member 220 can also be provided on the tube 206 at the rear of the unit 200 in order to limit forward movement of the tube 206.

When the pusher unit 200 is retracted, the wire W will be held stationary by a single blade 222 which is mounted on the rear supporting plate 224 at an angle to the wire. A small tubular member 226 is mounted on the support plate 224 and the wire passes through this member 226 freely in the direction of the arrow shown in FIG. 5 but cannot pass in the opposite direction because of "biting" engagement with the blade 222.

The wire W may be continuously fed to the pinning assembly from a source such as spool 221.

To summarize the pinning and crimping operations described thus far, the pinning mechanism 148 and the crimpers 144 and 146 will be retracted or moved away from the conveyor 16 when the lobe of the main cam 58 is at its uppermost position thus camming outwardly the bars 152. At the same time, a tortilla will be advanced into the pinning station 12 and positioned adjacent the crimpers 144 and 146. As the pinning mechanism is retracted, the wire pusher unit 200 will be reset, that is, it will be retracted relative to the rest of the assembly. With a tortilla in position to be crimped and the wire pusher unit 200 now reset, the continuously rotating main cam 58 will be rotated so that the lobe is now passing through the lowermost portion of its cycle. This cams outwardly the bars 158, pivoting outwardly the upright arms 170 which through the linkage 174 and 176 advances the entire pinning mechanism 148, and the crimper 146. As soon as the assembly carried by member 150 reaches the extent of its advance, the top of the tortilla will have been crimped and will be held in an S shape. Continued movement of arm 174 advances the pusher unit 200 to shove the wire through the tube 198, the holder 196, and the crimped tortilla. At the properly timed interval controlled by actuation of switch 68 by cam 62, the solenoid 182 will move the cutting bar 186 forward cutting off a length of the wire and thus leaving a "pin" in the tortilla holding it together.

The solenoid 214 is provided so that the wire will not be advanced by the pusher unit 200 in the event that a tortilla is not present or properly positioned between the crimpers 144 and 146. The solenoid 214 is controlled by a normally-closed limit switch 228 which has an operating rod positioned to be tripped when a tortilla is in proper position for pinning. The operating rod of switch 228 will be tripped by a tortilla as the tortilla is gripped by crimpers 144 and 146, the end of the said rod extending into the path of a tortilla as it is twisted laterally by the crimpers. If a tortilla is not properly positioned, switch 228 will remain closed and solenoid 214 will be energized to prevent the wire from being advanced by unit 200.

Side pinning and crimping station

At the third and last station 14 there are two additional pinners which are substantially identical in operation and construction to the pinning and wire pushing mechanism already described with reference to the "top pinner." These two other pinners are mounted so as to pin a folded and top-pinned tortilla along each end thereof. Thus, I provide wire pinning assembly 230 and assembly 232 which carry crimpers 234 and 236, respectively, that cooperate with the crimpers 238 and 240 mounted on the movable supporting rod 145 on the left side of the machine. The assemblies 230 and 232 of the illustrated embodiment are mounted at an angle with respect to table 15 because of the nature and shape of the folded, round tortilla. Obviously, they could be mounted at any desired position. The assemblies 230 and 232 include solenoids 240 and 242, respectively, which control the cutting of the wire inserted through each side of the tortilla. Solenoids 240 and 242 are controlled by switch 66 that is operated at the proper time by cam 60 on the main shaft 46. The assemblies 230 and 232 also include solenoids 244 and 246, respectively, which are controlled by a normally-closed limit switch 248 to prevent advance of the wire if a tortilla has not been positioned properly. The wire pinning assemblies 230 and 232 are advanced and retracted as a unit when the movable supporting member 150 is moved as has been previously described. Similarly, the wire pushers of assemblies 230 and 232 are all advanced and retracted simultaneously, their movement being controlled by the position of the lobe on the main cam 58. It should be noted that the cross-member 172 engages the operating arms of all three wire pushers simultaneously. It is obvious, therefore, that a tortilla whose top has been previously pinned and which has been advanced into the second pinning station will be pinned on its ends simultaneously with the pinning of the preceding tortilla along its top.

Similar to the no-tortilla no-pin feature of the pinning assembly 148, a limit switch 248 is provided to control the solenoids 244 and 246 in the pinning assemblies 230 and 232 thereby to prevent the wire from being advanced in the event a tortilla is not properly positioned in the second pinning station 14.

Operation of machine

The over-all operation of the machine should be evident from the above descriptions of the various sub-assemblies. Proper timing of the various operations of the machine is very important and is accomplished by means of the various solenoid valves and limit switches some of which are operated by the cams on the main shaft 46. However, in order to help clarify the over-all operation of the machine, the schematic wiring diagram shown in FIG. 7 has been included in the drawings.

Briefly, the flat torillas are individually carried through the various operations on holders 104. The tortillas on holders 104 are intermittently advanced by conveyor 16, the spacing of the holders 104 on conveyor chain 90 and the timing of the drive mechanism being such that a holder 104 will be properly positioned and momentarily stopped at each of the three stations 10, 12 and 14 between each period of advancement. Thus, a tortilla being carried on a holder 104 will be moved successively through each of the stations. To start the machine in operation, the switch 19 (FIG. 7) is closed to supply power to the motor 18. The conveyor 16 will immediately start its intermittent operation, and tortillas can be fed to the machine by placing one on each of the holders 104. As the first tortilla is moved into the filling station 10, it will be folded by the guide rails 106 and positioned beneath the filling wheel 110. While momentarily stopped there, the material in the hopper 111 will be fed into one of the compartments 114 in the filling wheel 110. If the tortilla is properly positioned on its holder so as to actuate the limit switch 138, the solenoid 118 will be energized as the switch 70 is closed by cam 64. The conveyor 16 will then move a short distance advancing the now-filled taco into the first crimping and pinning station 12. When the taco is in proper position between crimpers 114 and 146, the limit switch 228 will be opened, de-energizing solenoid 214 to allow the wire to be fed when the pinner 148 is advanced. While the conveyor 16 is momentarily stopped, the main cam 58 will then cause the pinning and crimping assembly to be advanced toward the conveyor 16 crimping the top edges of the taco. While held in the crimped position, the pinner 148 will cause a length of wire to be inserted into the taco. As the came 62 closes limit switch 68 and thus energizes solenoid 182, the length of wire will be cut off by cutting bar 186. The pinning and crimping assemblies will be retracted to release the taco which will be advanced as the conveyor is again advanced by the intermittent drive mechanism. When the filled and top-pinned taco has been advanced into the second or side pinning station 14 and properly positioned, it will open limit switch 248 to de-energize solenoids 244 and 246 thus allowing the wire to be fed when the pinners 230 and 232 are advanced. While the conveyor 16 is again momentarily stopped, main cam 58 will cause the side pinning and crimping assemblies to be advanced toward the conveyor 16 thereby crimping the edges of the taco. While thus held in the crimped position, the pinners 230 and 232 will cause a length of wire to be inserted into each crimped edge of the taco. As the cam 60 closes limit switch 66 and thus energizes solenoids 240 and 242, the lengths of wire will be cut off leaving the "pins" in the edges of the taco. The pinning and crimping assemblies will then be retracted as the filled and pinned tortilla, now a taco, is advanced to the discharge end of the machine and removed from its holder 104.

It will be understood that the above operations at each of the stations 10, 12 and 14 are all performed simultaneously on different tacos during each period of momentary rest of the conveyor 16. Thus, the machine will have a high rate of production if holders 104 are kept continuously supplied with tortillas. Of course, the spacing of the holders 104 on the conveyor chain 90 and the spacing of the stations 10, 12 and 14 must properly be designed and coordinated with the design of the drive mechanism in order to assure proper positioning of the tortillas at each of the stations.

The machine is relatively simple to operate and maintain and obviously the drive mechanism and other moving parts of the illustrated machine can be enclosed for safety and aesthetic reasons. Moreover, it will be obvious to those skilled in the art that various revisions and modifications can be made in the basic design of my novel machine without departing from the principles thereof. Obviously, the machine can be used for other purposes. It is therefore my intention that any such uses and any such modifications or revisions which are obvious to those skilled in the art will be included within the scope the following claims.

I claim:

1. A method for manufacturing a food product such as tacos or the like that consist of a thin shell of dough or the like which contains a filling, said method comprising: folding the edges of the thin shell slightly upwardly; placing a predetermined amount of filling in said folded shell; folding the edges of said shell upwardly an additional amount to partially enclose the filling; crimping said edges along the top margin thereof; pinning the edges of the shell together at the crimped portion of the top; crimping the edges of the shell together along each side; and pinning the edges of the shell together at the crimped portion along each side to retain the filling in the shell.

2. The method of claim 1 in which the edges of the shell are each crimped to a somewhat S-shape, and the pinning of the edges is accomplished by inserting a straight pin through each crimped edge.

3. A method for rapidly and continuously manufacturing a food product such as tacos or the like that consist of a thin shell of dough or the like which contains a filling, said method comprising: conveying a plurality of said shells which are initially in a flat condition at spaced intervals along a line through successive stations at each of which an operation takes place; cupping each of said shells slightly before it passes into the first station; placing a predetermined amount of filling in a cupped shell at the first station; fastening the top edges of a cupped shell together at the second station; and fastening the sides of said shell together at the last station.

4. The method of claim 3 in which said shells are moved intermittently through said stations, each shell being stopped momentarily at each station while the operation at that station is performed.

5. The method of claim 4 in which the operations at the stations are performed simultaneously upon different shells positioned at the stations.

6. An apparatus for manufacturing tacos or the like consisting of a dough-like shell which contains a filling, said apparatus comprising a filling station including means for dispensing a measured quantity of filling into one of said shells, means to fold the shell upwardly around the filling, a first fastening station including means to crimp the top edges of said folded shell and means to pin the crimped top edges together, a second fastening station including means to crimp the side edges of said folded shell and means to pin the crimped side edges together, and a conveyor adapted for moving a shell through said stations.

7. The apparatus of claim 6 in which said means to fold the shell includes continuously extending rails along each side of the conveyor beneath the shell being carried thereon, said rails gradually converging and rising to fold the shell.

8. The apparatus of claim 6 in which said conveyor is adapted to move said shell intermittently through said stations stopping momentarily at each station to permit the operation at that station to be performed.

9. The apparatus of claim 8 in which said conveyor is adapted to carry a plurality of shells at spaced intervals along its path, said intervals being spaced so that a shell can be presented and stopped momentarily to each of said stations simultaneously.

10. The apparatus of claim 9 in which means is provided at each station to prevent the operation at that station from being performed unless a shell is presented to said station.

11. The apparatus of claim 8 in which each of said crimping means includes a curved crimping member movable toward and away from said conveyor from each side thereof, each of said crimping means being so movable during the momentary stop of a shell at that station to crimp the edges and thereby provide for pinning of said edges together.

12. The apparatus of claim 11 in which each of said pinning means includes a wire holder positioned to guide the end of a continuous piece of wire through the crimped edge of a shell, a wire pusher to advance the wire through the crimped edge, and a wire cutter to cut off the length of wire inserted through the crimped edge.

13. The apparatus of claim 11 in which the crimping member on one side of the conveyor and the pinning means is movable as a unit toward said conveyor during the momentary stop of a shell being carried by said conveyor, said crimping member and pinning means being movable away from the conveyor after completion of the operation to provide for advance of the shell out of that station.

14. A method for manufacturing a food product such as tacos, or the like, that consist of a thin shell of dough or the like, containing a filling, said method comprising: cupping the shell by folding its edges upwardly so that it will retain the desired amount of filling as long as the shell is held in a level position; placing the desired amount of filling in said cupped shell; crimping the edges of said shell; and pinning the edges of shell together at the crimped portion to retain the filling in the shell regardless of whether the shell is held in a level position.

15. An apparatus for manufacturing tacos, or the like, that consist of a thin shell of dough containing a filling, said apparatus comprising a filling station including means for dispensing a measured quantity of filling into one of said shells, means for folding the edges of said shell containing filling upwardly and together, means for inserting a pin through the folded edges of said shell to hold them together, and means for conveying a shell of dough through said apparatus and presenting it to said filling means and then to said pin inserting means.

References Cited

UNITED STATES PATENTS

| | | | |
|---|---|---|---|
| Re. 12,820 | 6/1908 | Preston | 227—80 |
| 946,825 | 1/1910 | Plant | 227—79 |
| 1,236,998 | 8/1917 | Tommasini. | |
| 1,695,427 | 12/1928 | Helfgott | 107—49 |
| 2,627,222 | 3/1953 | Luna | 99—426 X |
| 2,773,442 | 12/1956 | Contreras | 99—404 |

ROBERT W. MICHELL, Primary Examiner

A. O. HENDERSON, Assistant Examiner

U.S. Cl. X.R.

99—426; 107—54; 227—79